May 5, 1931.  A. W. WENZEL  1,803,955

PACKING RING

Filed July 25, 1928

INVENTOR
Albert W. Wenzel,
BY
Everett Cook,
ATTORNEYS.

Patented May 5, 1931

1,803,955

UNITED STATES PATENT OFFICE

ALBERT W. WENZEL, OF ST. CLOUD, NEW JERSEY

PACKING RING

Application filed July 25, 1928. Serial No. 295,197.

This invention relates particularly to metallic piston packing rings of the split type commonly used in internal combustion engines and which are inherently radially resilient so as to maintain themselves in engagement with the cylinder walls.

One object of my invention is to provide a combination of a cylinder, piston and packing ring of this character which embodies novel and improved features of construction whereby "side slap" or movement of the piston transversely of the cylinder is restrained or prevented.

Another object is to provide such a ring embodying novel features of construction whereby it can also constantly conform to and is maintained in tight engagement with both side walls of the groove even upon "side slapping" of the piston, and under the high pressures in the combustion chamber of the cylinder.

Other objects are to provide a packing ring of the character described which is also axially resilient, having a normal width greater than the groove in the piston so as to tend to maintain itself in tight engagement with the side walls of the groove, and has its side walls inclined or beveled convergently toward the inner side of the ring; to provide such a ring having sufficient resistance to axial yielding as to overcome the resistance to movement of the ring upon the cylinder walls so that the side walls of the ring are maintained in tight engagement with both side walls of the groove at all times; to provide a piston packing ring of the character described so constructed that the radial expansion thereof is enhanced upon reciprocation of the piston by cooperation of the side walls of the ring and the groove; and to obtain other advantages and results as will be brought out by the following description.

Referring to the accompanying drawings, in which corresponding and like parts are designated throughout the several views by the same reference characters, Figure 1 is a sectional elevation of a piston having a packing ring embodying my invention applied thereto.

Figure 1:
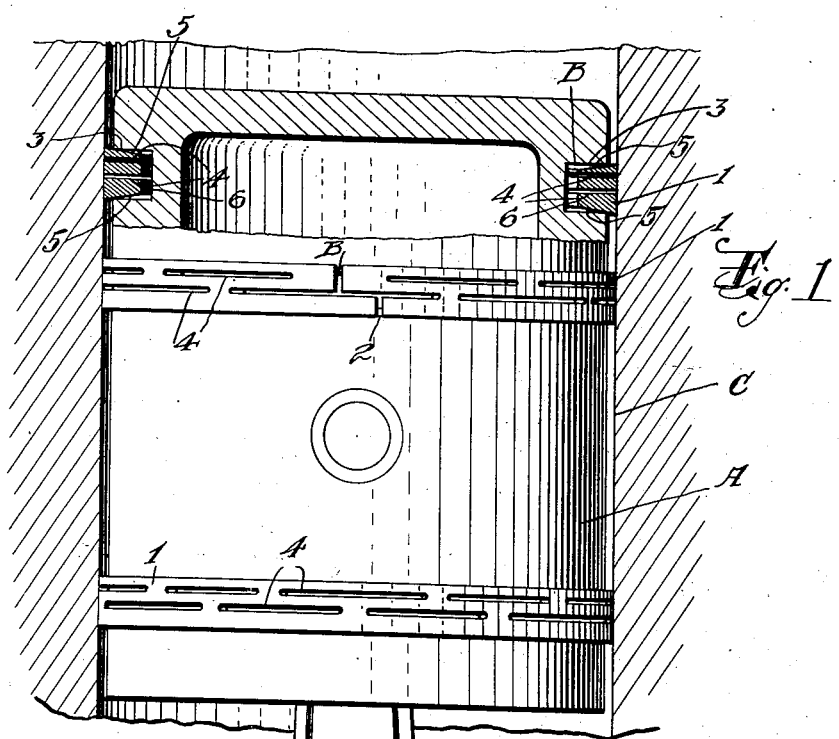

Specifically describing the illustrated embodiment of the invention, the reference character A designates a piston of the usual construction found in internal combustion engines, said piston having the usual packing ring grooves B in which are fitted packing rings 1 embodying my invention. The side walls 3 of the grooves are in planes substantially at right angles to the axis of the piston.

Figure 2:
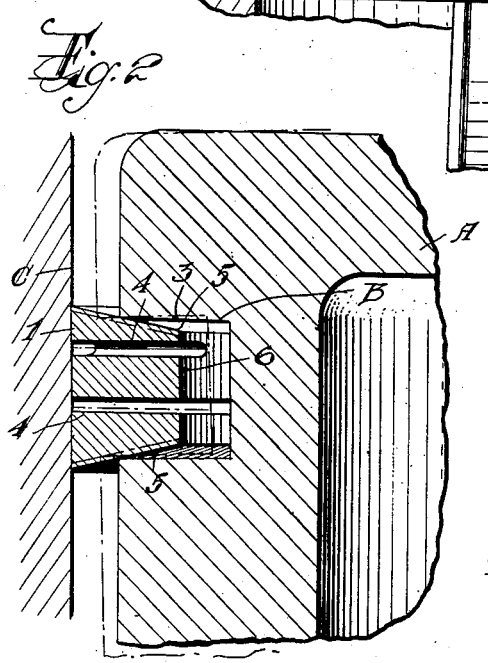
Figure 2 is an enlarged fragmentary sectional view.

These packing rings are usually formed of cast iron and are split as indicated at 2 so as to be radially resilient and when fitted in the packing ring groove to normally maintain themselves in engagement with the cylinder walls C. In accordance with my invention the rings 1 are also axially resilient and of a normal width at points intermediate their outer and inner surfaces greater than that of the packing ring groove B so that the ring tends to maintain itself in tight engagement with the side walls 3 of the groove. In the form of the invention shown in Figures 1 to 3, inclusive, this axial resiliency is obtained by forming two series of circumferentially spaced transverse slots 4 in the ring, the slots of one series being in staggered relation to the slots of the other series as clearly shown in Figure 1. The invention also contemplates forming the opposite side surfaces 5 of the ring of a beveled formation converging toward the inner side 6 of the ring. As shown in the drawings, the rings are substantially frusto-pyramidal or trapezoidal in cross-section.

As above stated, the rings are of a width greater than that of the groove B into which they are to be fitted, and therefore it is necessary to force the ring into the groove so as to compress it axially when the ring is being placed in the groove and the piston fitted in the cylinder. The ring has a normal radial resiliency which tends to hold it in tight engagement with the cylinder walls C, and the axial resiliency maintains its side walls 5 in tight engagement with the outer edge of the side walls 3 of the packing ring groove. Due to the beveled side surfaces 5 of the rings frictional resistance by engagement of the sides of the ring with the groove is practically eliminated and all inherent resilient radial pressure in the ring is applied toward holding the ring in engagement with the cylinder walls. The ring is also preferably so formed that its axial resiliency is sufficient to overcome the resistance incident to contact of the ring with the cylinder walls as the piston reciprocates so that the side walls of the ring and the groove are always in tight engagement with each other. In other words, the sides of the ring are normally forced into contact with the sides 3 of the groove B with such resilient pressure as to resist the high pressure of the combustion gases in the combustion chamber of the cylinder. This axial resiliency of the ring also restrains or prevents "side slap" or transverse movement of the piston in the cylinder as indicated by dot and dash lines in Figure 2, and even when "side slap" takes place, the ring is conformed to and maintained in tight engagement with the side walls of the groove. The illustration of this action is exaggerated in Figure 2 for the sake of clearness. Also, reciprocation of the piston causes cooperation of the side walls of the groove and the ring so as to tend to enhance the radial resiliency of the ring uniformly. The ring therefore overcomes the disadvantages of the usual ring in moving away from the sides of the groove upon reciprocation of the piston or under pressure of the combustion gases, and in addition the ring prevents or restrains "side slap" of the piston and consequent imperfect engagement of the ring with its groove and cylinder walls.

Figure 3:
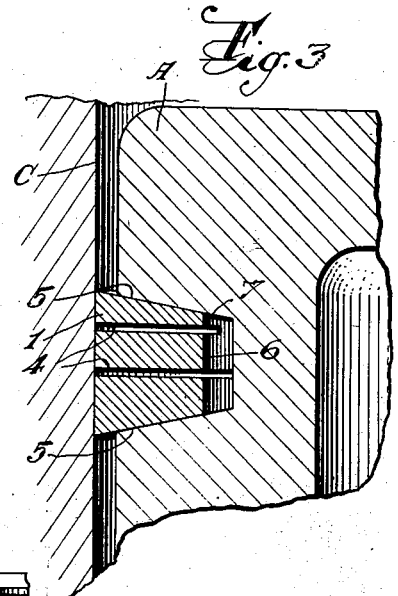
Figure 3 is a similar view showing a modification of the invention.
Figure 4:
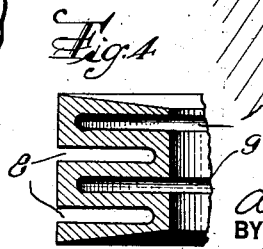
Figure 4 is a fragmentary sectional view of a modified form of packing ring.

In a modification of the invention, the side walls 7 of the packing ring groove are beveled to correspond with the beveled side walls of the ring as shown in Figure 3 of the drawings. The operation of this form of the invention is substantially the same as that above described, although the ring does not conform itself to the side walls of the groove upon "side slap" of the piston as effectively as does the construction shown in Figures 1 and 2. Figure 4 of the drawing illustrates a modified construction of the ring wherein the axial resiliency is obtained by a plurality of deep circumferential grooves 8 and 9 cut in the outer and inner sides respectively of the ring, said grooves being arranged in staggered relation. The operation of this type of ring is the same as that illustrated in connection with Figures 2 and 3, but not as good because not so resilient.

My invention therefore eliminates the necessity of the separate expanding spring commonly used with axially resilient rings to force the ring into contact with the cylinder walls; and at the same time gas tight contact of my ring with the side walls of the piston ring grooves and with the cylinder walls is ensured at all times and with a reduction of piston "side-slap."

Having thus described my invention, what I claim is:

1. The combination with a piston having a circumferential groove, of a one-piece metallic split radially and axially resilient packing ring having opposite side surfaces converging toward the inner side of the ring, said ring when axially expanded being of a width intermediate its inner and outer sides greater than the width of said groove, and when radially expanded being of a diameter greater than the cylinder, so that when the ring is applied to a piston and inserted in a cylinder axial and radial pressures are developed in the ring sufficient respectively to resist the pressures in the combustion chamber in the cylinder and to overcome the resistance to radial expansion of the ring caused by frictional contact of the side surfaces of the ring with the side walls of said groove, whereby said side surfaces constantly tightly engage both side walls of the groove and the outer surface of the ring is maintained in tight contact with the cylinder walls.

2. The combination with a cylinder and a piston having a circumferential groove with side walls at right angles to the axis of the piston, of a unitary split metallic radially resilient packing ring having an axially resilient portion intermediate opposite side portions and being substantially trapezoidal in cross-section with its opposite side surfaces converging toward the inner side of the ring, said ring being of a width normally greater than that of said groove so that when the ring is applied to a piston and inserted in a cylinder axial and radial pressures are developed in the ring sufficient respectively to resist the pressures in the combustion chamber in the cylinder and to overcome the resistance to radial expansion of the ring caused by frictional contact of the side surfaces of the ring with the side walls of said groove, whereby said side surfaces constantly tightly engage both side walls of the groove and the outer surface of the ring is maintained in tight contact with the cylinder walls, the bearing of the outer edges of said groove upon the side surfaces of the ring compensating for "side-slap" of the piston.

3. The combination of a piston having a groove provided with walls bevelled outward, and a ring in said groove and having walls bevelled inward for uniform pressure engagement with the bevelled walls of the groove, said ring being provided with an annular series of overlapping circumferential incisions of arcuate formation allowing the ring to be pressed into a groove having a width less than the normal width of the ring, the pressure thus created serving the dual purpose to expand the ring axially and radially.

4. The combination of a piston having a groove, and a ring having an axial dimension greater than the axial dimension of the groove and provided with an annular series of overlapping slits defining outer and intermediate overlapping members joined at the ends thereof with the body of the ring, said ring and said groove being provided with oppositely bevelled contact surfaces.

5. A packing for pistons or the like, comprising a split, unitary ring, and having a conical end surface and a plurality of longitudinal slots or flutes overlapping one another and cut in planes at an angle to the center line of the ring, the groove in the piston being provided with a conical wall corresponding to the conicity of the conical end surface of the ring.

6. A packing for pistons or the like comprising a split ring, formed of a single piece of metal both end surfaces of the ring being conical converging towards the center line of the ring and a plurality of longitudinal slots or flutes overlapping one another and cut in planes at an angle to the center line of the ring, the walls of the groove in the piston being shaped conically to correspond to the end surfaces of the ring.

7. A packing for pistons or the like comprising a split, unitary ring having a conical end surface and a plurality of longitudinal slots or flutes overlapping one another and cut in planes at an angle to the center line of the ring, the groove in the piston being provided with a conical wall corresponding to the conicity of the conical end surface of the ring, the thickness of the ring exceeding the breadth of the groove by the breadth of the slots.

8. A packing for pistons or the like, comprising a split, unitary ring having a conical end surface and a plurality of longitudinal slots or flutes overlapping one another and cut in planes at right angles to the center line of the ring, the groove in the piston being provided with a conical wall corresponding to the conicity of the conical end surface of the ring.

9. A packing for pistons or the like, comprising a split ring, both end surfaces of the ring being conical converging towards the center line of the ring, and a plurality of longitudinal slots or flutes overlapping one another and cut in planes at right angles to the center line of the ring, the walls of the groove in the piston being shaped conically to corresponding to the end surfaces of the ring.

ALBERT W. WENZEL.